United States Patent [19]

Kneller et al.

[11] 4,432,800

[45] Feb. 21, 1984

[54] BENEFICIATING KILN DUSTS UTILIZED IN POZZOLANIC REACTIONS

[75] Inventors: William A. Kneller; John P. Nicholson, both of Toledo, Ohio

[73] Assignee: N-Viro Energy Systems Ltd., Toledo, Ohio

[21] Appl. No.: 408,173

[22] Filed: Aug. 16, 1982

[51] Int. Cl.³ .............................................. C04B 7/26
[52] U.S. Cl. ...................... 106/85; 106/118; 106/120; 106/DIG. 1
[58] Field of Search ............ 106/85, 118, 120, DIG. 1

[56] References Cited

U.S. PATENT DOCUMENTS

| | | |
|---|---|---|
| 4,018,617 | 4/1977 | Nicholson ...................... 106/DIG. 1 |
| 4,038,095 | 7/1977 | Nicholson ...................... 106/DIG. 1 |
| 4,101,332 | 7/1978 | Nicholson ...................... 106/DIG. 1 |

*Primary Examiner*—James Poer
*Attorney, Agent, or Firm*—Barnes, Kisselle, Raisch, Choate, Whittemore & Hulbert

[57] ABSTRACT

The method of beneficiating kiln dusts which has insufficient reactive properties to produce desired pozzolanic reactions which method comprises adding small amounts of a material selected from the group consisting of CaO, calcium hydroxide and sodium hydroxide. The beneficiated dusts can be utilized with fly ash or fly ash and a filler to produce pozzolanic reactions and provide a durable mass.

21 Claims, No Drawings

BENEFICIATING KILN DUSTS UTILIZED IN POZZOLANIC REACTIONS

This invention relates to pozzolanic reactions and particularly to pozzolanic reactions involving fly ash and kiln dust with and without a filler.

| | TYPICAL CHEMICAL ANALYSES FOR CEMENT KILN STACK DUSTS | | | | | | | | | | |
|---|---|---|---|---|---|---|---|---|---|---|---|
| Ingredient | Source I | Source II | Source III | Source IV | Source V | Source VI | Source VII | Source VIII | Source IX | Source X | Average % |
| $SiO_2$ | 17.6 | 9.9 | 22.1 | 11.2 | 13.0 | 22.4 | 14.8 | 14.6 | 14.7 | 15.5 | 15.6 |
| $Al_2O_3$ | 4.4 | 3.1 | 4.7 | 3.2 | 4.0 | 10.0 | 3.4 | 3.4 | 3.7 | 4.0 | 4.4 |
| $Fe_2O_3$ | 2.0 | 1.2 | 1.8 | 1.4 | 5.0 | 4.1 | 2.2 | 2.2 | 3.0 | 1.5 | 2.4 |
| CaO | 39.6 | 47.6 | 63.7 | 48.8 | 47.2 | 19.4 | 47.3 | 46.3 | 46.5 | 43.2 | 44.9 |
| MgO | 2.0 | 1.3 | 2.6 | 2.1 | 1.2 | 0.6 | 2.1 | 2.0 | 2.0 | 2.1 | 1.8 |
| $SO_3$ | 3.8 | 0.9 | 1.1 | 2.4 | 13.6 | 10.1 | 4.8 | 5.0 | 8.2 | 5.0 | 5.7 |
| $Na_2O$ | 0.2 | 0.1 | 0.2 | 0.2 | 0.4 | 1.3 | 0.9 | 0.9 | 0.8 | 0.3 | 0.5 |
| $K_2O$ | 2.6 | 1.1 | 1.3 | 4.2 | 2.9 | 14.1 | 4.1 | 5.1 | 3.0 | 3.1 | 4.2 |
| Loss on Ignition | 26.6 | 31.6 | 2.5 | 26.6 | 12.9 | 13.2 | 21.1 | 21.4 | 18.2 | 23.9 | 19.8 |

BACKGROUND AND SUMMARY OF THE INVENTION

In U.S. Pat. Nos. 4,018,617, 4,038,095 and 4,101,332, there are disclosed mixtures and methods for making durable masses by utilizing fly ash, kiln dust and a filler, which through pozzolanic reactions produce a durable mass.

Where the total or entire kiln dust from a kiln such as a cement or line kiln is utilized, such pozzolanic reactions will occur and produce the desired product. However, it has become common in recent times for the operators of the kilns to remove portions of the dust for reuse. Thus, the separated dust may not be as reactive from a pozzolanic standpoint. It has also been common because of environmental conditions to condition the dust by adding moisture so that it can be handled and stored. This conditioning also diminishes the pozzolanic reactivity of the dusts.

Accordingly, the present invention is directed to a method of beneficiating separated or conditioned kiln dusts which are less reactive because of having been separated from the total kiln dust or because they have been conditioned or because they have been separated and conditioned.

In accordance with the invention, the method of beneficiating separated or conditioned kiln dusts which have insufficient reactive properties to produce desired pozzolanic reactions comprises adding small amounts of a material selected from the group consisting of CaO, calcium hydroxide and sodium hydroxide. The beneficiated dusts can be utilized with fly ash or fly ash and a filler to produce pozzolanic reactions and provide a durable mass.

The solid waste generated by cement manufacture is primarily kiln dust. Thus dust contains a mixture of raw kiln feed, partly calcined material, finely divided cement klinker and alkaline and alkali carbonates and sulfates (usually sulfates). There is economic value in returning the dust to the kiln, but when the alkali content of the returned dust is too high for the product clinker to meet specifications, the dust must be discarded. Up to about 15% of the raw materials processed may be collected as dust and of this about half may be low enough in alkalis to be returned to the kiln. The rest usually stockpiled as a waste material which usually is discarded and may be a nuisance and possibly a hazard.

Typically, the major oxides found in a cement kiln dust are: $SiO_2$, $Al_2O_3$, $Fe_2O_3$, CaO, MgO, $So_3$, $Na_2O$ and $K_2O$.

More specifically, typical cement kiln dusts may have the following analyses:

| RANGE OF TYPICAL CHEMICAL ANALYSES FOR CEMENT KILN STACK DUSTS | | | |
|---|---|---|---|
| Ingredient | Low % | High % | Mid-Range |
| $SiO_2$ | 9.9 | 22.4 | 16.2 |
| $Al_2O_3$ | 3.1 | 10.0 | 6.5 |
| $Fe_2O_3$ | 1.2 | 5.0 | 3.1 |
| CaO | 19.4 | 63.7 | 41.5 |
| MgO | 0.6 | 2.6 | 1.6 |
| $SO_3$ | 1.1 | 13.6 | 7.3 |
| $Na_2O$ | 0.1 | 1.3 | 0.7 |
| $K_2O$ | 1.1 | 14.1 | 7.6 |
| Loss on Ignition | 2.5 | 31.6 | 17.1 |

The solid waste generated by line manufacture is primarily lime stack dust. This dust contains a mixture of raw kiln feed, partly calcined material, and finely divided material. There is no value in returning the dust to the kiln, as it is too fine and passes directly through to the precipitator again. Up to about 15% of the raw materials processed may be collected as dust. It is usually stockpiled as a waste material which usually is discarded and may be a nuisance and possibly a hazard.

Typically, the major oxides found in lime stack dust are: CaO, MgO, $SO_3$, $CO_2$ and Available Free Lime.

More specifically, typical lime stack dusts may have the following analyses:

| CHEMICAL ANALYSES OF DOLOMITIC LIME KILN DUSTS FOR MAJOR OXIDES AND FREE (AVAILABLE) LIME | | | | | | | |
|---|---|---|---|---|---|---|---|
| Sample No. | CaO | MgO | S | $CO_2$ | Loss on Ignition | Free (Available) Lime | $SO_3$ |
| 1 | 43.39 | 29.82 | 0.80 | 22.30 | 24.60 | 17.58 | — |
| 2 | 37.54 | 27.10 | — | 17.72 | 26.99 | 10.98 | 3.43 |
| 3 | 35.86 | 26.20 | — | 12.84 | 30.15 | 8.29 | 4.99 |
| 4 | 35.85 | 32.03 | 0.77 | 21.5 | 34.66 | 8.63 | — |
| 5 | 43.42 | 32.24 | 0.82 | 13.0 | 22.92 | 20.17 | — |
| 6 | 35.86 | 25.99 | 0.41 | 21.8 | 36.38 | 7.96 | — |
| 7 | 39.50 | 30.02 | 0.74 | 17.58 | 26.78 | 15.58 | — |
| 8 | 35.58 | 25.39 | 0.23 | 18.96 | 35.78 | 8.68 | — |
| 9 | 40.90 | 30.02 | 0.78 | 11.02 | 24.46 | 15.54 | — |
| 10 | 39.22 | 25.99 | 0.95 | 22.2 | — | 11.43 | — |
| 11 | 37.54 | 28.00 | 0.60 | 19.00 | — | 13.22 | — |
| 12 | 35.99 | 27.80 | 1.20 | — | 31.86 | 9.75 | — |
| 13 | 40.62 | 30.72 | 0.62 | — | 25.53 | 16.58 | — |
| Mean | 38.55 | 28.56 | 0.70 | 17.99 | 29.10 | 12.64 | — |
| Max | 43.42 | 32.24 | 1.02 | 22.30 | 36.38 | 20.17 | — |

-continued

| CHEMICAL ANALYSES OF DOLOMITIC LIME KILN DUSTS FOR MAJOR OXIDES AND FREE (AVAILABLE) LIME | | | | | | | |
|---|---|---|---|---|---|---|---|
| Sample No. | CaO | MgO | S | $CO_2$ | Loss on Ignition | Free (Available) Lime | $SO_3$ |
| Min | 35.58 | 25.39 | 0.23 | 11.02 | 22.92 | 8.29 | — |
| Range | 7.84 | 6.85 | 0.79 | 11.28 | 13.46 | 11.88 | — |
| Mid-Range | 39.50 | 28.81 | 0.62 | 16.66 | 29.65 | 14.23 | — |

| CHEMICAL ANALYSES OF DOLOMITIC LIME KILN DUST SHOWING MAJOR AND MINOR OXIDES AND FREE (AVAILABLE) LIME | | | | | | | | | | |
|---|---|---|---|---|---|---|---|---|---|---|
| Sample Source No. | PERCENT | | | | | | | | | |
| | $SiO_2$ | $Al_2O_3$ | $Fe_2O_3$ | CaO | MgO | $SO_3$ | $K_2O$ | $Na_2O$ | LOI | Free Lime |
| 14 | 9.2 | 5.3 | 6.8 | 28.5 | 20.5 | 6.4 | 0.5 | 0.2 | 18.2 | 34.0 |
| 15 | 2.5 | 0.7 | 0.9 | 31.2 | 23.5 | 2.8 | 0.1 | 0.0 | 37.4 | 5.1 |
| 16 | 0.6 | 0.1 | 0.6 | 35.6 | 23.8 | 0.9 | 0.0 | 0.0 | 36.2 | 2.9 |
| 17 | 6.4 | 1.4 | 0.7 | 35.1 | 21.5 | 0.0 | 0.1 | 0.0 | 35.3 | 2.0 |
| Mean | 4.7 | 1.9 | 2.2 | 32.6 | 22.3 | 2.5 | 0.2 | >0.1 | 31.8 | 11.0 |
| Maximum | 9.2 | 5.3 | 6.8 | 35.6 | 23.5 | 6.4 | 0.5 | 0.2 | 37.4 | 34.0 |
| Minimum | 0.6 | 0.1 | 0.6 | 28.5 | 20.5 | 0.0 | 0.1 | 0.0 | 18.2 | 2.0 |
| Range | 8.6 | 5.2 | 6.2 | 7.1 | 3.0 | 6.4 | 0.4 | 0.2 | 19.2 | 32.0 |
| Mid Range | 4.9 | 2.7 | 3.7 | 32.0 | 22.0 | 3.2 | 0.3 | 0.1 | 27.8 | 18.0 |

Note:
Free (available) Lime is listed for convenience and is not part of the oxide analyses.

| CHEMICAL ANALYSES OF HIGH CALCIUM LIME KILN DUST FOR MAJOR AND MINOR OXIDES AND FREE (AVAILABLE) LIME | | | | | | | | | | |
|---|---|---|---|---|---|---|---|---|---|---|
| Sample Source No. | PERCENT | | | | | | | | | |
| | $SiO_2$ | $Al_2O_3$ | $Fe_2O_3$ | CaO | MgO | $SO_3$ | $K_2O$ | $Na_2O$ | LOI | Free Lime |
| 1 | 9.9 | 4.2 | 2.0 | 54.5 | 0.5 | 8.0 | 0.2 | 0.0 | 14.2 | 26.4 |
| 2 | 10.1 | 4.9 | 1.4 | 44.3 | 3.6 | 4.8 | 0.4 | 0.1 | 27.5 | 2.6 |
| 3 | 1.9 | 0.5 | 0.4 | 66.1 | 2.2 | 1.7 | 0.1 | 0.0 | 19.6 | 40.8 |
| 4 | 3.4 | 1.8 | 0.8 | 56.7 | 1.1 | 0.3 | 0.2 | 0.0 | 34.4 | 13.1 |
| 5 | 3.2 | 1.2 | 3.5 | 58.0 | 0.4 | 2.2 | 0.1 | 0.0 | 27.6 | 14.5 |
| 6 | 12.7 | 4.8 | 1.4 | 62.4 | 0.7 | 2.0 | 0.2 | 0.1 | 8.4 | 29.7 |
| Mean | 6.9 | 2.9 | 2.1 | 57.0 | 1.4 | 3.2 | 0.2 | >0.1 | 22.0 | 21.2 |
| Maximum | 10.1 | 4.9 | 3.5 | 66.1 | 3.6 | 8.0 | 0.4 | 0.1 | 34.4 | 40.8 |
| Minimum | 1.9 | 0.5 | 0.4 | 44.3 | 0.4 | 0.3 | 0.1 | 0.0 | 8.5 | 2.6 |
| Range | 8.2 | 4.4 | 3.1 | 21.8 | 3.2 | 7.7 | 0.3 | 0.1 | 25.9 | 38.2 |
| Mid Range | 6.0 | 2.7 | 2.0 | 55.2 | 2.0 | 4.2 | 1.6 | >0.1 | 21.4 | 21.7 |

Note:
Free (available) Lime is listed for convenience and is not part of the oxide analyses.

The term "fly ash" as used in connection with stabilized bases is well known and as used herein is intended to indicate the finely divided ash residue produced by the combustion of pulverized coal or lignite, which ash is carried off with the gases exhausted from the furnace in which the coal is burned and which is collected from these gases usually by means of suitable precipitation apparatus such as electrical precipitators. Those finely pulverized ashes resulting from combusion of oil and from combustion of waste materials in a large incinerator or natural pozzolan can also be utilized in the methods described herein providing their chemical compositions are resonably similar to pulverized coal fly ashes. The fly ash so obtained is in a finely divided state such that usually at least 70% by weight passes through a 200-mesh sieve, although incinerator ashes may be considerably coarser. Fly ash may be considered an "artificial pozzolan", as distinguished from a "natural pozzolan".

The term "aggregate" as used in connection with load supporting compositions is also well known and refers to natural or artificial inorganic materials most of which are substantially chemically inert with respect to fly ash and lime, and substantially insoluble in water. Typically, aggregate may comprise limestone, dolostone sand, blast furnace slag, gravel, synthetic aggregate and other similar material.

Aggregates can comprise a wide range of types and gradations, including sands, gravels, crushed stones, and several types of slag. Aggregates should be of such gradation that, when mixed with cement kiln dust, fly ash and water, the resulting mixture is mechanically stable under compaction equipment and capable of being compacted in the field to high density. The aggregate should be free from deleterious organic or chemical substances which may interfere with the desired chemical reaction between the cement kiln dust, fly ash and water. Further, the aggregate should preferably consist of hard, durable particles, free from soft or disintegrated pieces.

In addition, depending upon the end use of the durable mass, various sludges can be used as fillers and can be stabilized or chemically fixed. Typical sludges are sulfur scrubbing sludges from power plants, waste water treatment sludges from municipal sewage plants and industrial waste sludges.

Where the filler comprises sludges, the percentages of filler set forth herein as being by dry weight include the liquid content of the sludge.

In accordance with the invention, kiln dusts which have lesser reactivity can be beneficiated to produce a desired pozzolanic reaction by mixing the kiln dust, pozzolan such as fly ash and filler and water and adding a small amount of a material selected from the group "A" is the compressive (CS) or the vacuum (VS) strengths with an additive.

"B" is the compressive or the vacuum strengths without an additive.

"C" is the compressive or the vacuum strengths using CaCO₃ as a blank or control to measure only the strength effect of the additive.

"E" is the positive or negative effect of the additive on the strengths of the admixtures. This effect hereafter will be designated a negative or positive "synergistic effect."

TABLE 1

(Marginal Dust)

| AMOUNT OF ADDITIVE | STRENGTH "A" | MOISTURE CONTENT % | STRENGTH "B" | MOISTURE CONTENT % | STRENGTH "C" | MOISTURE CONTENT % | "E" |
|---|---|---|---|---|---|---|---|
| 0.25% CaO | 1050 (CS) | 9.3 | 580 (CS) | 9.2 | 205 (CS) | 8.6 | 265 |
| 0.50% CaO | 1435 (CS) | 9.3 | 580 (CS) | 9.2 | 575 (CS) | 9.2 | 280 |
| 0.50% CaO | 1290 (VS) | 9.3 | 635 (VS) | 9.6 | 495 (VS) | 8.5 | 160 |
| 0.75% CaO | 1475 (CS) | 10.6 | 580 (CS) | 9.2 | 345 (CS) | 11.3 | 550 |
| 0.75% CaO | 1450 (VS) | 10.9 | 635 (VS) | 9.6 | 320 (VS) | 13.8 | 495 |
| 1.14% CaO | 1590 (CS) | 11.0 | 580 (CS) | 9.2 | 665 (CS) | 10.3 | 345 |
| 1.14% CaO | 1390 (VS) | 9.8 | 635 (VS) | 9.6 | 440 (VS) | 10.4 | 315 |
| 1.50% CaO | 1360 (CS) | 9.9 | 580 (CS) | 9.2 | 665 (CS) | 11.1 | 115 |
| 1.50% CaO | 1235 (VS) | 18.8 | 635 (VS) | 9.6 | 730 (VS) | 7.7 | −130 |
| 0.75% Ca(OH)₂ | 1250 (CS) | 9.7 | 580 (CS) | 9.2 | 170 (CS) | 13.5 | 500 |
| 0.75% Ca(OH)₂ | 1195 (VS) | 9.2 | 635 (VS) | 9.6 | 320 (VS) | 12.2 | 240 |
| 1.50% Ca(OH)₂ | 1010 (CS) | 11.8 | 580 (CS) | 9.2 | 260 (CS) | 12.7 | 170 |
| 1.50% Ca(OH)₂ | 1105 (VS) | 12.2 | 635 (VS) | 9.6 | 400 (VS) | 11.2 | 70 |
| 3.0% Ca(OH)₂ | 1065 (CS) | 10.7 | 580 (CS) | 9.2 | 595 (CS) | 11.8 | −110 |
| 3.0% Ca(OH)₂ | 1110 (VS) | 10.6 | 635 (CS) | 9.6 | 415 (VS) | 12.4 | 60 |
| 0.75% CaO | 1410 (CS) | 5.9 | 235 (CS) | 8.2 | 345* (CS) | 11.3 | 830 |

*The cylinders containing CaCO₃ as a substitute for kiln dust used Trenton Channel Fly ash.

TABLE 2

(Marginal Dust)

| AMOUNT OF ADDITIVE | STRENGTH "A" | MOISTURE CONTENT % | STRENGTH "B" | MOISTURE CONTENT % | STRENGTH "C" | MOISTURE CONTENT % | "E" |
|---|---|---|---|---|---|---|---|
| 0.76% CaO | 1110 (CS) | 7.2 | 675 (CS) | 10.2 | 345 (CS) | 11.3 | 90 |
| 0.75% CaO | 1515 (VS) | 9.9 | 725 (VS) | 7.4 | 320 (VS) | 13.8 | 470 |
| 1.14% CaO | 1435 (CS) | 7.8 | 675 (CS) | 10.2 | 665 (CS) | 10.3 | 95 |
| 1.14% CaO | 1810 (VS) | 9.3 | 725 (VS) | 7.4 | 440 (VS) | 10.4 | 645 |
| 1.50% CaO | 1395 (CS) | 10.5 | 675 (CS) | 10.2 | 665 (CS) | 11.1 | 55 |
| 1.50% CaO | 1600 (VS) | 9.4 | 725 (VS) | 7.4 | 730 (VS) | 7.7 | 145 |
| 0.75% Ca(OH)₂ | 1265 (CS) | 10.7 | 675 (CS) | 10.2 | 170 (CS) | 13.5 | 420 |
| 0.75% Ca(OH)₂ | 1215 (VS) | 10.6 | 725 (VS) | 7.4 | 320 (VS) | 12.2 | 170 |
| 1.50% Ca(OH)₂ | 2045 (CS) | 9.7 | 675 (CS) | 10.2 | 260 (CS) | 12.7 | 1110 |
| 1.50% Ca(OH)₂ | 1700 (VS) | 10.1 | 725 (VS) | 7.4 | 400 (VS) | 11.2 | 575 |
| 3.0% Ca(OH)₂ | 1540 (CS) | 11.7 | 675 (CS) | 10.2 | 595 (CS) | 11.8 | 270 |
| 3.0% Ca(OH)₂ | 1510 (VS) | 11.7 | 725 (VS) | 7.4 | 415 (VS) | 12.4 | 370 |

TABLE 3

(Marginal Dust)

| AMOUNT OF ADDITIVE | STRENGTH "A" | MOISTURE CONTENT % | STRENGTH "B" | MOISTURE CONTENT % | STRENGTH "C" | MOISTURE CONTENT % | "E" |
|---|---|---|---|---|---|---|---|
| 0.38% CaO | 220 (CS) | 11.6 | FS (NO VALUE) (CS) | 7.0 | 245 (CS) | 11.6 | −25 |
| 0.76% CaO | 900 (CS) | 6.3 | FS (NO VALUE) (CS) | 7.0 | 345 (CS) | 11.3 | 555 |
| 1.14% CaO | 820 (CS) | 11.8 | FS (NO VALUE) (CS) | 7.0 | 665 (CS) | 10.3 | 155 |
| 0.75% Ca(OH)₂ | 435 (CS) | 8.2 | FS (NO VALUE) (CS) | 7.0 | 170 (CS) | 13.5 | 265 |
| 1.50% Ca(OH)₂ | 360 (CS) | 11.8 | FS (NO VALUE) (CS) | 7.0 | 260 (CS) | 12.7 | 100 |

FS - Cylinder fell apart in 4 hour water soak.

TABLE 4

(Conditioned Dust)

| AMOUNT OF ADDITIVE | STRENGTH "A" | MOISTURE CONTENT % | STRENGTH "B" | MOISTURE CONTENT % | STRENGTH "C" | MOISTURE CONTENT % | "E" |
|---|---|---|---|---|---|---|---|
| 0.25% CaO | 160 (CS) | 10.6 | FS (NO VALUE) (CS) |  | 205 (CS) | 8.6 | −45 |
| 0.25% CaO | BC (NO VALUE) (VS) | 11.5 | FVS (NO VALUE) (VS) |  | 215 (VS) | 9.1 | −215 |
| 0.50% CaO | 340 (CS) | 11.4 | FS (NO VALUE) (CS) |  | 575 (CS) | 9.2 | −235 |
| 0.50% CaO | 670 (VS) | 10.1 | FVS (NO VALUE) (VS) |  | 495 (VS) | 8.5 | 175 |
| 0.76% CaO | 1030 (CS) | 13.7 | FS (NO VALUE) (CS) | 12.1 | 345 (CS) | 11.3 | 685 |
| 0.75% CaO | 675 (VS) | 9.3 | FVS (NO VALUE (VS) | 9.4 | 320 (VS) | 13.8 | 355 |
| 1.14% CaO | 1180 (CS) | 12.9 | FS (NO VALUE) (CS) | 12.1 | 665 (CS) | 10.3 | 515 |
| 1.14% CaO | 800 (VS) | 9.8 | FVS (NO VALUE) (VS) | 9.4 | 440 (VS) | 10.4 | 360 |
| 1.50% CaO | 1095 (CS) | 11.2 | FS (NO VALUE) (CS) | 12.1 | 665 (CS) | 11.1 | 430 |
| 1.50% CaO | 1560 (VS) | 10.7 | FVS (NO VALUE) (VS) | 9.4 | 730 (VS) | 7.7 | 830 | consisting of CaO, calcium hydroxide and sodium hydroxide. It has been found that the addition of small amounts of these materials will sufficiently beneficiate the kiln dust so that when the kiln dust is mixed with a pozzolan such as fly ash or fly ash and a filler such as aggregate or sludge, a desired pozzolanic reaction will be achieved.

The additions are made to the mixture just prior to the use of the kiln dusts, that is, when water is added to the mixture of kiln dust and fly ash or the mixture of kiln dust, fly ash and filler.

The additions are added to mixtures containing kiln dusts, pozzolans (fly ash), and filler in the following ranges by weight:
kiln dust: 4–16%
pozzolan: 6–24%
filler: 60–90%

When mixtures made in accordance with the invention and mixed with water to produce a pozzolanic reaction have been tested in accordance with the specifications given in ASTM C-593 for fly ash and other pozzolans for use with lime, it has been found that the compositions meet or exceed the specifications.

In accordance with ASTM C-593, three cylinders were made from each mixture by weight of 8% cement kiln stack dust or lime kiln stack dust, 8% Trenton Channel fly ash, 84% limestone aggregate from France Stone Co. In addition, about 40 milliliters of water was added to a pound of the mix. Furthermore, a specified amount of additive (percent by weight of the dry total mix) was added to the water to make a slurry. This slurry was then added in the dry mix.

The additives used were quicklime (CaO), powdered, technical grade calcium oxide; hydrated lime (Ca(OH)$_2$), powdered, reagent grade calcium hydroxide, and sodium hydroxide (NaOH), certified ACS grade pellets. The additive was mixed with about two-thirds the estimated volume of water needed for the mix. When quicklime or sodium hydroxide was used the slurry was allowed to cool to room temperature before adding the dry blend of cement kiln dust, fly ash, and aggregate.

Cement kiln dusts are classified as follows: (1) Marginal; (2) Separated; (3) Conditioned and (4) Separated and Conditioned. Marginal dusts are those which develop low compressive strength during initial testing or when used in mixes without additives. Separated dusts are those which have been passed through mechanical or electrostatic precipitators. During processing, the coarser particles are separated in the first or early stages. Usually these particles are recycled in the kiln. The second or tertiary, etc., stages generally are composed of the finer and finer fractions that become the waste dusts. Conditioned dusts are those which may be treated at the plant or in the laboratory. At the plant the waste dust is treated with a controlled amount of water (typically 10–15% by weight) to facilitate handling and storage and to ensure compliance with environmental regulations. In the case of the laboratory conditioned dust 12 percent by weight of water is added to dusts. Mixing is performed with the batch mixer utilizing the same modified bread hook as is used for mixing batches for the strength tests. Mixing time is five minutes, and large balls are broken by hand during initial mixing, whereas the smaller balls produced during mixing are not broken up. The ducts are then stored in a plastic pail open at the top for free access to air and moisture. Separated and Conditioned dusts are those dusts which have an origin similar to separated dusts except they have been treated with a controlled amount of water. In addition lime kiln dusts were studied and can be classified as High-Calcium and Dolomitic dusts. It is believed that the high calcium lime kiln dust should have a limit of approximately 5 percent MgO (3% would be more desirable but it is deemed impracticable at this stage). In contrast, dolomitic lime kiln dusts exhibit MgO content in excess of 5%. However, magnesian kiln dusts were omitted purposefully from this classification because no dusts of this MgO composition (5–20%) were tested.

Cylinders were made and tested in accordance with ASTM Standard C-593. These cylinders were enclosed in two self-sealing plastic bags and were held in an oven for seven days at 100° F.±3°. At the end of the cure, the cylinders were soaked in water for four hours, and were capped and tested.

The vacuum saturation cylinders were also cured at 100° F.±3° for seven days. These cylinders at the end of the curing period were allowed to cool to room temperature, and were placed in a vacuum of 24 inches Hg for 30 minutes. After this time, they were flooded with water and were soaked in water for 60 minutes, and then they were capped and tested.

Cylinders, using calcium catbonate (CaCO$_3$, a precipitated powder, laboratory grade), in place of a kiln dust, were made and tested as a control to measure any synergistic effect of the additive. The CaCO$_3$ was selected as a control because it is an inert material. Furthermore, the particle size of the CaCO$_3$ is very close to that of the kiln dusts.

The Tables 1 through 19 have been arranged to list the compressive and vacuum saturation strengths and moisture content data for mixtures of kiln dust, fly ash, and aggregate with and without the additives. In addition, these tables also list average compressive and vacuum saturation strengths, the average moisture contents of mixtures of fly ash, aggregate and powdered CaCO$_3$. The CaCO$_3$ admixtures were made to exhibit the strength development only caused by the reaction of lime with the fly ash.

Fifteen kiln dusts were selected and used for compressive and vacuum saturation strength tests of mixtures of kiln dust, fly ash, and aggregate to which were added CaO or Ca(OH)$_2$ as water slurries. In addition, three of the fifteen dusts with the same fly ash and aggregate were tested to observe the effect of a caustic solution or NaOH rather than CaO or Ca(OH)$_2$.

The compressive and vacuum saturation strength data are listed in the tables and are designed as follows:

Strength "A"—strength of 8-8-84 mixture of kiln dust, fly ash and aggregate with a specified amount of an additive.
Strength "B"—strength of 8-8-84 mixture of kiln dust, fly ash, and aggregate without an additive.
Strength "C"—strength of 8-8-84 mixture of powdered CaCO$_3$ was used in place of kiln dust, but mixed with fly ash, and aggregate, and a specified amount of an additive.

The data listed in the last column in the tables were derived by the following formula:

$$A - B - C = \pm E$$

where:

TABLE 4-continued (Conditioned Dust)

| AMOUNT OF ADDITIVE | STRENGTH "A" | MOISTURE CONTENT % | STRENGTH "B" | MOISTURE CONTENT % | STRENGTH "C" | MOISTURE CONTENT % | "E" |
|---|---|---|---|---|---|---|---|
| 0.75% Ca(OH)$_2$ | 585 (CS) | 11.1 | FS (NO VALUE) (CS) | 12.1 | 170 (CS) | 13.5 | 415 |
| 0.75% Ca(OH)$_2$ | 275 (VS) | 9.4 | FVS (NO VALUE) (VS) | 9.4 | 320 (VS) | 12.2 | −45 |
| 1.50% Ca(OH)$_2$ | 660 (CS) | 11.5 | FS (NO VALUE) (CS) | 12.1 | 260 (CS) | 12.7 | 400 |
| 1.50% Ca(OH)$_2$ | 820 (VS) | 9.6 | FVS (NO VALUE) (VS) | 9.4 | 400 (VS) | 11.2 | 420 |
| 3.0% Ca(OH)$_2$ | 975 (CS) | 12.5 | FS (NO VALUE) (CS) | 12.1 | 595 (CS) | 11.8 | 380 |
| 3.0% Ca(OH)$_2$ | 1365 (VS) | 10.5 | FVS (NO VALUE) (VS) | 9.4 | 415 (VS) | 12.4 | 950 |

BC - Cylinder broke while removing from capper.
FS - Cylinder fell apart in 4 hour water soak.
FVS - Cylinder crumbled while placing in vacuum saturation sample support.

TABLE 5

(Conditioned Dust)

| AMOUNT OF ADDITIVE | STRENGTH "A" | MOISTURE CONTENT % | STRENGTH "B" | MOISTURE CONTENT % | STRENGTH "C" | MOISTURE CONTENT % | "E" |
|---|---|---|---|---|---|---|---|
| 0.75% CaO | 1230 (CS) | 8.0 | 490 (CS) | 11.4 | 345 (CS) | 11.3 | 395 |
| 0.75% CaO | 1420 (VS) | 7.6 | 355 (VS) | 11.7 | 320 (VS) | 13.8 | 745 |
| 1.14% CaO | 1350 (CS) | 11.4 | 490 (CS) | 11.4 | 665 (CS) | 10.3 | 195 |
| 1.14% CaO | 1165 (VS) | 11.0 | 355 (VS) | 11.7 | 440 (VS) | 10.4 | 370 |
| 1.50% CaO | 1395 (CS) | 10.2 | 490 (CS) | 11.4 | 665 (CS) | 11.1 | 240 |
| 1.50% CaO | 1405 (VS) | 9.7 | 355 (VS) | 11.7 | 730 (VS) | 7.7 | 320 |
| 0.75% Ca(OH)$_2$ | 1105 (CS) | 8.4 | 490 (CS) | 11.4 | 170 (CS) | 13.5 | 445 |
| 0.75% Ca(OH)$_2$ | 1205 (VS) | 9.1 | 355 (VS) | 11.7 | 320 (VS) | 12.2 | 530 |
| 1.50% Ca(OH)$_2$ | 990 (CS) | 9.6 | 490 (CS) | 11.4 | 260 (CS) | 12.7 | 240 |
| 1.50% Ca(OH)$_2$ | 730 (VS) | 17.1 | 355 (VS) | 11.7 | 400 (VS) | 11.2 | −25 |
| 3.0% Ca(OH)$_2$ | 1400 (CS) | 10.8 | 490 (CS) | 11.4 | 595 (CS) | 11.8 | 315 |
| 3.0% Ca(OH)$_2$ | 1525 (VS) | 10.7 | 355 (VS) | 11.7 | 415 (VS) | 12.4 | 755 |

TABLE 6

(Separated and Conditioned Dust)

| AMOUNT OF ADDITIVE | STRENGTH "A" | MOISTURE CONTENT % | STRENGTH "B" | MOISTURE CONTENT % | STRENGTH "C" | MOISTURE CONTENT % | "E" |
|---|---|---|---|---|---|---|---|
| 0.75% CaO | 880 (CS) | 11.5 | FS (NO VALUE) (CS) | 7.8 | 345 (CS) | 11.3 | 535 |
| 0.75% CaO | 920 (VS) | 11.1 | FV (NO VALUE) (VS) | 11.5 | 320 (VS) | 13.8 | 600 |
| 1.14% CaO | 1215 (CS) | 12.1 | FS (NO VALUE) (CS) | 7.8 | 665 (CS) | 10.3 | 550 |
| 1.14% CaO | 1035 (VS) | 10.3 | FV (NO VALUE) (VS) | 11.5 | 440 (VS) | 10.4 | 595 |
| 1.50% CaO | 1260 (CS) | 10.4 | FS (NO VALUE) (CS) | 7.8 | 665 (CS) | 11.1 | 595 |
| 1.50% CaO | 1230 (VS) | 12.8 | FV (NO VALUE) (VS) | 11.5 | 730 (VS) | 7.7 | 500 |
| 0.75% Ca(OH)$_2$ | 650 (CS) | 11.2 | FS (NO VALUE) (CS) | 7.8 | 170 (CS) | 13.5 | 480 |
| 0.75% Ca(OH)$_2$ | 705 (VS) | 11.3 | FV (NO VALUE) (VS) | 11.5 | 320 (VS) | 12.2 | 385 |
| 1.50% Ca(OH)$_2$ | 1220 (CS) | 11.9 | FS (NO VALUE) (CS) | 7.8 | 260 (CS) | 12.7 | 960 |
| 1.50% Ca(OH)$_2$ | 1155 (VS) | 11.7 | FV (NO VALUE) (VS) | 11.5 | 400 (VS) | 11.2 | 755 |
| 3.0% Ca(OH)$_2$ | 1415 (CS) | 11.5 | FS (NO VALUE) (CS) | 7.8 | 595 (CS) | 11.8 | 820 |
| 3.0% Ca(OH)$_2$ | 1215 (VS) | 11.5 | FV (NO VALUE) (VS) | 11.5 | 415 (VS) | 12.4 | 800 |

FS - Cylinder fell apart in 4 hour water soak.
FV - Cylinder fell apart in one hour water soak.

TABLE 7

(Separated and Conditioned Dust)

| AMOUNT OF ADDITIVE | STRENGTH "A" | MOISTURE CONTENT % | STRENGTH "B" | MOISTURE CONTENT % | STRENGTH "C" | MOISTURE CONTENT % | "E" |
|---|---|---|---|---|---|---|---|
| 0.38% CaO | 630 (CS) | 11.4 | 145 (CS) | 10.8 | 245 (CS) | 11.6 | 240 |
| 0.76% CaO | 1125 (CS) | 10.2 | 145 (CS) | 10.8 | 345 (CS) | 11.3 | 635 |
| 1.14% CaO | 1615 (CS) | 8.0 | 145 (CS) | 10.8 | 665 (CS) | 10.3 | 805 |
| 0.75% Ca(OH)$_2$ | 1060 (CS) | 10.4 | 145 (CS) | 10.8 | 170 (CS) | 13.5 | 745 |
| 1.50% Ca(OH)$_2$ | 935 (CS) | 11.3 | 145 (CS) | 10.8 | 260 (CS) | 12.7 | 530 |

TABLE 8

(Separated Dust)

| AMOUNT OF ADDITIVE | STRENGTH "A" | MOISTURE CONTENT % | STRENGTH "B" | MOISTURE CONTENT % | STRENGTH "C" | MOISTURE CONTENT % | "E" |
|---|---|---|---|---|---|---|---|
| 0.25% CaO | 1645 (CS) | 9.1 | 1130 (CS) | 9.5 | 205 (CS) | 8.6 | 310 |
| 0.25% CaO | 1610 (VS) | 9.1 | 1065 (VS) | 9.7 | 215 (VS) | 9.1 | 330 |
| 0.50% CaO | 1830 (CS) | 8.8 | 1130 (CS) | 9.5 | 575 (CS) | 9.2 | 125 |
| 0.50% CaO | 1720 (VS) | 9.0 | 1065 (VS) | 9.7 | 495 (VS) | 8.5 | 160 |
| 0.75% CaO | 1715 (CS) | 9.7 | 1130 (CS) | 9.5 | 345 (CS) | 11.3 | 240 |
| 0.75% CaO | 1655 (VS) | 10.2 | 1065 (VS) | 9.7 | 320 (VS) | 13.8 | 270 |
| 1.14% CaO | 1415 (CS) | 9.4 | 1130 (CS) | 9.5 | 665 (CS) | 10.3 | −380 |

TABLE 8-continued
(Separated Dust)

| AMOUNT OF ADDITIVE | STRENGTH "A" | MOISTURE CONTENT % | STRENGTH "B" | MOISTURE CONTENT % | STRENGTH "C" | MOISTURE CONTENT % | "E" |
|---|---|---|---|---|---|---|---|
| 1.14% CaO | 1540 (VS) | 9.0 | 1065 (VS) | 9.7 | 440 (VS) | 10.4 | 35 |
| 1.50% CaO | 1925 (VS) | 9.3 | 1130 (CS) | 9.5 | 665 (CS) | 11.1 | 130 |
| 1.50% CaO | 1355 (VS) | 10.2 | 1065 (VS) | 9.7 | 730 (VS) | 7.7 | −440 |
| 0.75% Ca(OH)$_2$ | 1230 (CS) | 10.8 | 1130 (CS) | 9.5 | 170 (CS) | 13.5 | −70 |
| 0.75% Ca(OH)$_2$ | 1155 (VS) | 9.6 | 1065 (VS) | 9.7 | 320 (VS) | 12.2 | −230 |
| 1.50% Ca(OH)$_2$ | 1455 (CS) | 7.5 | 1130 (CS) | 9.5 | 260 (CS) | 12.7 | 65 |
| 1.50% Ca(OH)$_2$ | 1385 (VS) | 7.6 | 1065 (VS) | 9.7 | 400 (VS) | 11.2 | −80 |
| 3.0% Ca(OH)$_2$ | 1775 (CS) | 9.1 | 1130 (CS) | 9.5 | 595 (CS) | 11.8 | 50 |
| 3.0% Ca(OH)$_2$ | 1285 (VS) | 11.6 | 1065 (VS) | 9.7 | 415 (VS) | 12.4 | −195 |

TABLE 9
(Dolomitic Lime Kiln Dust)

| AMOUNT OF ADDITIVE | STRENGTH "A" | MOISTURE CONTENT % | STRENGTH "B" | MOISTURE CONTENT % | STRENGTH "C" | MOISTURE CONTENT % | "E" |
|---|---|---|---|---|---|---|---|
| 0.75% CaO | 965 (CS) | 8.7 | 1035 (CS) | 10.2 | 345 (CS) | 11.3 | −415 |
| 0.75% CaO | 1690 (VS) | 8.6 | 975 (VS) | 9.4 | 320 (VS) | 13.8 | +395 |
| 1.14% CaO | 1440 (CS) | 10.7 | 1035 (CS) | 10.2 | 665 (CS) | 10.3 | −260 |
| 1.14% CaO | 1330 (VS) | 9.0 | 975 (VS) | 9.4 | 440 (VS) | 10.4 | −85 |
| 1.50% CaO | 1030 (CS) | 10.0 | 1035 (CS) | 10.2 | 665 (CS) | 11.1 | −670 |
| 1.50% CaO | 875 (VS) | 7.0 | 975 (VS) | 9.4 | 730 (VS) | 7.7 | −830 |
| 0.75% Ca(OH)$_2$ | 645 (CS) | 9.4 | 1035 (CS) | 10.2 | 170 (CS) | 13.5 | −560 |
| 0.75% Ca(OH)$_2$ | 825 (VS) | 10.7 | 975 (VS) | 9.4 | 320 (VS) | 12.2 | −470 |
| 1.50% Ca(OH)$_2$ | 745 (CS) | 9.5 | 1035 (CS) | 10.2 | 260 (CS) | 12.7 | −550 |
| 1.50% Ca(OH)$_2$ | 885 (VS) | 10.7 | 975 (VS) | 9.4 | 400 (VS) | 11.2 | −490 |
| 3.0% Ca(OH)$_2$ | 785 (CS) | 8.2 | 1035 (CS) | 10.2 | 595 (CS) | 11.8 | −845 |
| 3.0% Ca(OH)$_2$ | 725 (VS) | 8.6 | 975 (VS) | 9.4 | 415 (VS) | 12.4 | −665 |

TABLE 10
(Dolomitic Lime Kiln Dust)

| AMOUNT OF ADDITIVE | STRENGTH "A" | MOISTURE CONTENT % | STRENGTH "B" | MOISTURE CONTENT % | STRENGTH "C" | MOISTURE CONTENT % | "E" |
|---|---|---|---|---|---|---|---|
| 0.75% CaO | 1040 (CS) | 10.6 | 1315 (CS) | 10.8 | 345 (CS) | 11.3 | −620 |
| 0.75% CaO | 1050 (VS) | 9.3 | 1085 (VS) | 11.5 | 320 (VS) | 13.8 | −355 |
| 1.00% CaO* | 785 (CS) | 10.4 | 1315 (CS) | 10.8 | 665 (CS)** | 10.3 | −1195 |
| 1.00% CaO* | 735 (VS) | 4.5 | 1085 (VS) | 11.5 | 440 (VS)** | 10.4 | −790 |
| 1.50% CaO | 675 (CS) | 11.5 | 1315 (CS) | 10.8 | 665 (CS) | 11.1 | −1305 |
| 1.50% CaO | 1080 (VS) | 9.0 | 1085 (VS) | 11.5 | 730 (VS) | 7.7 | −735 |
| 0.75% Ca(OH)$_2$ | 1580 (CS) | 10.2 | 1315 (CS) | 10.8 | 170 (CS) | 13.5 | +95 |
| 0.75% Ca(OH)$_2$ | 1180 (VS) | 7.3 | 1085 (VS) | 11.5 | 320 (VS) | 12.2 | −225 |
| 1.50% Ca(OH)$_2$ | 1570 (CS) | 15.3 | 1315 (CS) | 10.8 | 260 (CS) | 12.7 | −5 |
| 1.50% Ca(OH)$_2$ | 960 (VS) | 9.7 | 1085 (VS) | 11.5 | 400 (VS) | 11.2 | −525 |
| 3.0% Ca(OH)$_2$ | 1880 (CS) | 9.7 | 1315 (CS) | 10.8 | 595 (CS) | 11.8 | −30 |
| 3.0% Ca(OH)$_2$ | 1520 (VS) | 9.3 | 1085 (VS) | 11.5 | 415 (VS) | 12.4 | −20 |

*The Cylinders were made with an addition of 1.00% CaO before the decision was made to use additions of 1.14% CaO.
**CaO addition of 1.14%.

TABLE 11
(High Calcium Lime Kiln Dust)

| AMOUNT OF ADDITIVE | STRENGTH "A" | MOISTURE CONTENT % | STRENGTH "B" | MOISTURE CONTENT % | STRENGTH "C" | MOISTURE CONTENT % | "E" |
|---|---|---|---|---|---|---|---|
| 0.75% CaO | 1790 (CS) | 10.3 | 2500 (CS) | 9.8 | 345 (CS) | 11.3 | −1055 |
| 0.75% CaO | 1855 (VS) | 10.4 | 3330 (VS) | 10.1 | 320 (VS) | 13.8 | −1795 |
| 1.14% CaO | 1460 (CS) | 11.5 | 2500 (CS) | 9.8 | 665 (CS) | 10.3 | −1705 |
| 1.14% CaO | 2225 (VS) | 12.1 | 3330 (VS) | 10.1 | 440 (VS) | 10.4 | −1545 |
| 1.50% CaO | 1850 (CS) | 10.8 | 2500 (CS) | 9.8 | 665 (CS) | 11.1 | −1315 |
| 1.50% CaO | 2680 (VS) | 11.9 | 3330 (VS) | 10.1 | 730 (VS) | 7.7 | −1380 |
| 0.75% Ca(OH)$_2$ | 2185 (CS) | 9.2 | 2500 (CS) | 9.8 | 170 (CS) | 13.5 | −485 |
| 0.75% Ca(OH)$_2$ | 1935 (VS) | 9.5 | 3330 (VS) | 10.1 | 320 (VS) | 12.2 | −1715 |
| 1.50% Ca(OH)$_2$ | 1895 (CS) | 9.1 | 2500 (CS) | 9.8 | 260 (CS) | 12.7 | −865 |
| 1.50% Ca(OH)$_2$ | 1760 (VS) | 8.1 | 3330 (VS) | 10.1 | 400 (VS) | 11.2 | −1970 |
| 3.0% Ca(OH)$_2$ | 1395 (CS) | 11.0 | 2500 (CS) | 9.8 | 595 (CS) | 11.8 | −1700 |
| 3.0% Ca(OH)$_2$ | 1350 (VS) | 11.2 | 3330 (VS) | 10.1 | 415 (VS) | 12.4 | −2395 |

TABLE 12
(High Calcium Lime Kiln Dust)

| AMOUNT OF ADDITIVE | STRENGTH "A" | MOISTURE CONTENT % | STRENGTH "B" | MOISTURE CONTENT % | STRENGTH "C" | MOISTURE CONTENT % | "E" |
|---|---|---|---|---|---|---|---|
| 0.75% CaO | 1475 (CS) | 8.8 | 595 (CS) | 9.4 | 345 (CS) | 11.3 | 535 |

TABLE 12-continued (High Calcium Lime Kiln Dust)

| AMOUNT OF ADDITIVE | STRENGTH "A" | MOISTURE CONTENT % | STRENGTH "B" | MOISTURE CONTENT % | STRENGTH "C" | MOISTURE CONTENT % | "E" |
|---|---|---|---|---|---|---|---|
| 0.75% CaO | 1810 (VS) | 9.1 | 1405 (VS) | 9.2 | 320 (VS) | 13.8 | 85 |
| 1.14% CaO | 1255 (CS) | 10.1 | 595 (CS) | 9.4 | 665 (CS) | 10.3 | −5 |
| 1.14% CaO | 1580 (VS) | 9.8 | 1405 (VS) | 9.2 | 440 (VS) | 10.4 | −265 |
| 1.50% CaO | 1485 (CS) | 9.6 | 595 (CS) | 9.4 | 665 (CS) | 11.1 | 225 |
| 1.50% CaO | 1585 (VS) | 9.5 | 1405 (VS) | 9.2 | 730 (VS) | 7.7 | −550 |
| 0.75% Ca(OH)$_2$ | 1480 (CS) | 10.0 | 595 (CS) | 9.4 | 170 (CS) | 13.5 | 715 |
| 0.75% Ca(OH)$_2$ | 1570 (VS) | 9.6 | 1405 (VS) | 9.2 | 320 (VS) | 12.2 | −155 |
| 1.50% Ca(OH)$_2$ | 1585 (CS) | 9.1 | 595 (CS) | 9.4 | 260 (CS) | 12.7 | 730 |
| 1.50% Ca(OH)$_2$ | 1235 (VS) | 10.3 | 1405 (VS) | 9.2 | 400 (VS) | 11.2 | −570 |
| 3.0% Ca(OH)$_2$ | 995 (CS) | 11.0 | 595 (CS) | 9.4 | 595 (CS) | 11.8 | −195 |
| 3.0% Ca(OH)$_2$ | 1390 (VS) | 9.5 | 1405 (VS) | 9.2 | 415 (VS) | 12.4 | −430 |

TABLE 13

| AMOUNT OF ADDITIVE | STRENGTH "A" | MOISTURE CONTENT % | STRENGTH "B" | MOISTURE CONTENT % | STRENGTH "C" | MOISTURE CONTENT % | "E" |
|---|---|---|---|---|---|---|---|
| Lime kiln dust from Dravo Lime Co. (Maysville, Ky.) coarse lime kiln dust. | | | | | Lab conditioned for 16 weeks. (High Calcium Lime Kiln Dust) | | | |
| 0.75% CaO | 1795 (CS) | 8.8 | 1145 (CS) | 10.2 | 345 (CS) | 11.3 | 305 |
| Lime kiln dust from Martin-Marietta (Woodville, Ohio) from Poz-O-Pak Plant | | | | | Lab conditioned 14.1 weeks. (Dolomitic Lime Kiln Dust) | | | |
| 0.75% CaO | 1240 (CS) | 10.5 | 395 (CS) | 10.0 | 345 (CS) | 11.3 | 500 |
| Cement kiln dust from Columbia Cement (Zanesville, Ohio) Precipitator dust. | | | | | Lab conditioned 31 days. (Separated Cement Kiln Dust) | | | |
| 0.75% CaO | 1220 (CS) | 11.0 | 515 (CS) | 10.2 | 345 (CS) | 11.3 | 360 |
| River Cement (Festus, Mo) | (Conditioned 36 days) (Marginal Cement Kiln Dust) | | | | | | | |
| 0.75% CaO | 1370 (CS) | 9.5 | 270 (CS) | 9.9 | 345 (CS) | 11.3 | 755 |

TABLE 14

| AMOUNT OF ADDITIVE | STRENGTH "A" | MOISTURE CONTENT % | STRENGTH "B" | MOISTURE CONTENT % | STRENGTH "C" | MOISTURE CONTENT % | "E" |
|---|---|---|---|---|---|---|---|
| 0.75% CaO | 455 (CS) | 13.0 | (FS) (NO VALUE) (CS) | 11.7 | 345 (CS) | 11.3 | 110 |
| 0.75% CaO | 575 (VS) | 12.1 | (FS) (NO VALUE) (CS) | 11.7 | 320 (VS) | 13.8 | 255 |
| 3.0% CaO | 610 (CS) | 12.4 | (FS) (NO VALUE) (CS) | 11.7 | ND | ND | ND |
| 0.75% Ca(OH)$_2$ | 390 (CS) | 13.8 | (FS) (NO VALUE) (CS) | 11.7 | 170 (CS) | 13.5 | 220 |
| 0.75% Ca(OH)$_2$ | 475 (CS) | 10.8 | (FS) (NO VALUE) (CS) | 11.7 | 170 (CS) | 13.5 | 305 |
| 1.50% Ca(OH)$_2$ | 765 (CS) | 12.8 | (FS) (NO VALUE) (CS) | 11.7 | 260 (CS) | 12.7 | 505 |
| 1.50% Ca(OH)$_2$ | 670 (VS) | 12.1 | (FS) (NO VALUE) (CS) | 11.7 | 400 (VS) | 11.2 | 270 |
| 3.0% Ca(OH)$_2$ | 675 (CS) | 16.2 | (FS) (NO VALUE) (CS) | 11.7 | 595 (CS) | 11.8 | 80 |

FS—Cylinder fell apart in four hour water soak.
ND—Not determined.

TABLE 15

| AMOUNT OF ADDITIVE | STRENGTH "A" | MOISTURE CONTENT % | STRENGTH "B" | MOISTURE CONTENT % | STRENGTH "C" | MOISTURE CONTENT % | "E" |
|---|---|---|---|---|---|---|---|
| 0.76% CaO | 1385 (CS) | 8.4 | 840 (CS) | 10.6 | 345 (CS) | 11.3 | 200 |
| 1.14% CaO | 1420 (CS) | 8.5 | 840 (CS) | 10.6 | 665 (CS) | 10.3 | −85 |

TABLE 16

| AMOUNT OF ADDITIVE | STRENGTH "A" | MOISTURE CONTENT % | STRENGTH "B" | MOISTURE CONTENT % | STRENGTH "C" | MOISTURE CONTENT % | "E" |
|---|---|---|---|---|---|---|---|
| 0.25% CaO | 1745 (CS) | 10.3 | 1510 (CS) | 7.0 | 205 (CS) | 8.6 | 30 |
| 0.25% CaO | 1900 (VS) | 9.8 | 1510 (CS)* | 7.0 | 215 (VS) | 9.1 | 175 |
| 0.50% CaO | 2285 (CS) | 8.8 | 1510 (CS) | 7.0 | 575 (CS) | 9.2 | 200 |
| 0.50% CaO | 2215 (VS) | 9.0 | 1510 (CS)* | 7.0 | 495 (VS) | 8.5 | 210 |

*This value is compressive strength rather than vacuum saturation strength.

TABLE 17

| AMOUNT OF ADDITIVE | STRENGTH "A" | MOISTURE CONTENT % | STRENGTH "B" | MOISTURE CONTENT % | STRENGTH "C" | MOISTURE CONTENT % | "E" |
|---|---|---|---|---|---|---|---|
| Cement kiln dust from Lone Star Industries (Dixon, Ill.) | | | | | | | |
| 1.0% NaOH | 830 (CS) | 8.5 | (FS) (NO VALUE) (CS) | 7.0 | 455 (CS) | 11.4 | 375 |
| Cement Kiln dust from River Cement (Festus, Mo.) | | | | | | | |
| 1.0% NaOH | 1360 (CS) | 9.0 | 675 (CS) | 10.2 | 455 (CS) | 11.4 | 230 |
| Cement kiln dust from Lone Star Industries (Bonner Springs, Kans.) crushed conditioned pellets | | | | | | | |

TABLE 17-continued

| AMOUNT OF ADDITIVE | STRENGTH "A" | MOISTURE CONTENT % | STRENGTH "B" | MOISTURE CONTENT % | STRENGTH "C" | MOISTURE CONTENT % | "E" |
| --- | --- | --- | --- | --- | --- | --- | --- |
| 0.50% NaOH | 210 (CS) | 9.1 | (FS) (NO VALUE) (CS) | 12.1 | ND | ND | ND |

FS—Cylinder fell apart in four hour water soak.
ND—Not determined.

TABLE 18

| AMOUNT OF ADDITIVE | STRENGTH "A" | MOISTURE CONTENT % | STRENGTH "B" | MOISTURE CONTENT % | STRENGTH "C" | MOISTURE CONTENT % | "E" |
| --- | --- | --- | --- | --- | --- | --- | --- |
| Mixtures made from cement kiln dust from California Portland (Colton, Calif.) and France Aggregate | | | | | with Fly Ash from Western Ash Co. (Color 2, Class "F") | | |
| 0.75% CaO | 1385 (CS) | 8.5 | 960 (CS) | 8.7 | 345* (CS) | 11.3 | 80 |
| Mixtures made from cement kiln dust from SME Cement (Middlebranch, Ohio) Aggregate | | | | | With Toledo Edison Bay Shore Fly Ash and France | | |
| 0.75% CaO** | 1815 (CS) | 9.3 | 650 (CS) | 8.8 | 345* (CS) | 11.3 | 820 |
| 0.75% CaO*** | 1580 (CS) | 9.8 | 650 (CS) | 8.8 | 345* (CS) | 11.3 | 585 |

*The cylinders containing CaCO3 as a substitute for kiln dust used Trenton Channel Fly Ash.
**CaO slurry cooled for 20 minutes
***CaO mixed with water for one minute before adding to dry blend

TABLE 19

| AMOUNT OF ADDITIVE | STRENGTH "A" | MOISTURE CONTENT % | STRENGTH "B" | MOISTURE CONTENT % | STRENGTH "C" | MOISTURE CONTENT % | "E" |
| --- | --- | --- | --- | --- | --- | --- | --- |
| Cement kiln dust from SME Cement (Toledo, Ohio) | | | with Toledo Edison Bayshore Fly Ash | | and France Aggregate | | |
| 0.75% CaO | 2050 (CS) | 10.1 | 1380* (CS) | 7.7 | 345** (CS) | 11.3 | 325 |
| Cement kiln dust from Columbia Cement (Zanesville, Ohio) (Precipitator Dust) and France Aggregate | | | | | with Fly Ash from Monier Resources (Cincinnati, Ohio) | | |
| 0.75% CaO | 1410 (CS) | 5.5 | 915* (CS) | 10.2 | 345* (CS) | 11.3 | 150 |

*The cylinders without additive were made from an 8-8-84 mix.
**The cylinders made with CaCO3 as a substitute for kiln dust used Trenton Channel Fly Ash and were made from an 8-8-84 mix. The values in the last column should be interpreted with caution as the mix designs were not all the same (6-8-86 vs. 8-8-84) and the fly ash in the CaCO3 cylinders was not the same as was used in the cylinders containing kiln dust.

I. CEMENT KILN DUSTS
A. Marginal Dusts
1. General Portland (Chattanooga, Tenn.) Table 1

The cylinder strengths for the mixture without additives ranged from 580 to 635 psi, whereas cylinder strengths with the addition of CaO ranged from 1050 to 1590 psi. Both strengths for batches with the addition of $Ca(OH)_2$ ranged from 1010 to 1250 psi. The range of values of "synergistic effects" for the compressive (CS) and vacuum saturation (VS) strengths for each amount of additive follow:

| Amount and Type of Additive | Range of Values of "Synergistic Effect" (psi) | |
| --- | --- | --- |
| | (CS) | (VS) |
| 0.75% CaO | 90 | 470 |
| 1.14% CaO | 95 | 645 |
| 1.50% CaO | 55 | 145 |
| 0.75% Ca(OH)2 | 420 | 170 |
| 1.50% Ca(OH)2 | 1110 | 575 |
| 3.0% Ca(OH)2 | 270 | 370 |

| Amount and Type of Additive | Range of Values of "Synergistic Effect" (psi) | |
| --- | --- | --- |
| | (CS) | (VS) |
| 0.25% CaO | 265 | * |
| 0.50% CaO | 280 | 160 |
| 0.75% CaO | 550 | 495 |
| 1.14% CaO | 345 | 315 |
| 1.50% CaO | 115 | −130 |
| 0.75% Ca(OH)2 | 500 | 240 |
| 1.50% Ca(OH)2 | 170 | 70 |
| 3.0% Ca(OH)2 | −110 | 60 |

*Only Compressive strength run on this addition.

2. River Cement (Festus, Missouri) Table 2

The cylinder strengths for the mixture without additives ranged from 675 and 725 psi, whereas strengths for the addition of CaO ranged from 1110 to 1810 psi. Strengths for batches with the addition of $Ca(OH)_2$ ranged from 1215 to 2045 psi. The range of values of the "synergistic effects" for the compressive (CS) and vacuum saturation (VS) strengths for each amount of additive follow:

3. Lone Star Industries (Dixon, Ill.) Table 3.

Compressive strengths only were measured on the mixtures with this dust. The mixture without additives did not develop strength. The compressive strengths for the addition of CaO ranged from 220 to 900 psi, whereas the strengths for the addition of $Ca(OH)_2$ ranged from 360 to 435 psi. The values of the "synergistic effect" for the compressive strength for each amount of additive follow:

| Amount and Type of Additive | Values of "Synergistic Effect" (psi) (CS) |
| --- | --- |
| 0.38% CaO | −25 |
| 0.76% CaO | 555 |
| 1.14% CaO | 155 |
| 0.75% Ca(OH)2 | 265 |
| 1.50% Ca(OH)2 | 100 |

B. Separated Dust
1. Columbia Cement (Zanesville, Ohio) Table 8.

The cylinder strengths for the mixture without additive ranged from 1065 to 1130 psi, whereas the cylinder strengths with the addition of CaO ranged from 1355 to 1925 psi. Cylinder strengths with the addition of Ca(OH)$_2$ ranged from 1155 to 1775 psi. The range of "synergistic effects" for the compressive (CS) and vacuum saturation (VS) strengths for each amount of additive follow:

| Amount and Type of Additive | Range of Values of "Synergistic Effect" (psi) | |
| --- | --- | --- |
|  | (CS) | (VS) |
| 0.25% CaO | 310 | 330 |
| 0.50% CaO | 125 | 160 |
| 0.75% CaO | 240 | 270 |
| 1.14% CaO | −380 | 35 |
| 1.50% CaO | 130 | −440 |
| 0.75% Ca(OH)$_2$ | −70 | −230 |
| 1.50% Ca(OH)$_2$ | 65 | −80 |
| 3.0% Ca(OH)$_2$ | 50 | −195 |

C. Conditioned Dusts

1. Conditioned at the Plant a. Lone Star Industries (Bonner Springs, Kansas) (crushed conditioned pellets) Table 4

The cylinders of this mixture without additives did not develop strength. The cylinders were the addition of CaO ranged from 0* to 1560 psi, whereas the cylinder strengths with the addition of Ca(OH)$_2$ ranged from 275 to 1365 psi. The range of values of the "synergistic effects" for the compressive (CS) and vacuum saturation (VS) strengths for each amount of additive follow:
*Zero value because the cylinders broke while removing them from the capper.

| Amount and Type of Additives | Range of Values of "Synergistic Effect" (psi) | |
| --- | --- | --- |
|  | (CS) | (VS) |
| 0.25% CaO | −45 | −215 |
| 0.50% CaO | −235 | 175 |
| 0.75% CaO | 685 | 355 |
| 1.14% CaO | 515 | 360 |
| 1.50% CaO | 430 | 830 |
| 0.75% Ca(OH)$_2$ | 415 | −45 |
| 1.50% Ca(OH)$_2$ | 400 | 420 |
| 3.0% Ca(OH)$_2$ | 380 | 950 | b. Martin-Marietta Cement (Tulsa, Okla.) (conditioned dust) Table 5

The cylinder strengths for the mixtures without additives ranged from 355 to 490 psi, whereas the cylinder strengths with the addition of CaO ranged from 1165 to 1420 psi. Cylinder strengths with the addition of Ca(OH)$_2$ ranged from 730 to 1525 psi. The range of values of the "synergistic effects" for the compressive (CS) and vacuum saturation (VS) strengths for each amount of additive follow:

| Amount and Type of Additives | Range of Values of "Synergistic Effect" (psi) | |
| --- | --- | --- |
|  | (CS) | (VS) |
| 0.75% CaO | 395 | 745 |
| 1.14% CaO | 195 | 370 |
| 1.50% CaO | 240 | 320 |
| 0.75% Ca(OH)$_2$ | 445 | 530 |
| 1.50% Ca(OH)$_2$ | 240 | −25 |
| 3.0% Ca(OH)$_2$ | 315 | 755 |

2. Conditioned in the Laboratory With 12% Added Water. (Cylinders made from these were tested only for compressive strength without additives and with an addition of 0.75% CaO). Table 13 a. River Cement (Festus, Mo.)

This is a marginal dust conditioned for 36 days prior to making mixtures for the compressive strength test. The cylinders made with this lab-conditioned dust without an additive exhibited a 270 psi average strength, whereas the cylinder made with unconditioned dust without additive is 605 psi. Addition of 0.75% CaO to a mix containing a lab-conditioned dust increased the cylinder strength to 1370 psi. This resulted in a "synergistic effect" of 755 psi.

b. Columbia Cement (Zanesville, Ohio) (Precipitator dust)

This material is a separated kiln dust conditioned in the laboratory for 31 days. The cylinders made with this lab conditioned dust without additive showed the 515 psi strength, whereas the cylinder strengths made with unconditioned dust without additive ranged from 915 psi (a Cincinnati fly ash from Monier Resources was used) to 1130 psi (a St. Albans fly ash from Pozzolanic, Inc., was used). A comparison of the fly ash used in these tests with the Trenton Channel fly ash is not available. Addition of 0.75% CaO increased the average strength of the cylinders to 1220 psi. This resulted in a "synergistic effect" for this lab conditioned dust of 360 psi.

D. Separated and Conditioned Dusts

1. General Portland (Tampa, Fla.) (Crushed conditioned pellets) Table 6

Cylinders made with this dust without additives did not develop strength. The average cylinder strengths for the addition of CaO ranged from 880 to 1260 psi, whereas the average strengths with the addition of Ca(OH)$_2$ ranged from 650 to 1415 psi. The values of the "synergistic effects" for the compressive (CS) and vacuum saturation (VS) strengths for each amount of additive follow:

| Amount and Type of Additive | Range of Values of "Synergistic Effect" (psi) | |
| --- | --- | --- |
|  | (CS) | (VS) |
| 0.75% CaO | 535 | 600 |
| 1.14% CaO | 550 | 595 |
| 1.50% CaO | 595 | 500 |
| 0.75% Ca(OH)$_2$ | 480 | 385 |
| 1.50% Ca(OH)$_2$ | 960 | 755 |
| 3.0% Ca(OH)$_2$ | 820 | 800 |

2. Dundee Cement (Clarksville, Mo.) Table 7

Cylinders made with this dust were tested only for compressive strength. The cylinders made without additive developed a compressive strength of 145 psi. The average compressive strengths for cylinders made with the addition of CaO ranged from 630 to 1615 psi, whereas the average strengths for the addition of Ca(OH)$_2$ ranged from 935 to 1060 psi. The values of the "synergistic effect" for the compressive strength for each amount of additive follow:

| Amount and Type of Additive | Values of "Synergistic Effect" (psi) (CS) |
| --- | --- |
| 0.38% CaO | 240 |
| 0.76% CaO | 635 |
| 1.14% CaO | 805 |
| 0.75% Ca(OH)$_2$ | 745 |

| Amount and Type of Additive | Values of "Synergistic Effect" (psi) (CS) |
|---|---|
| 1.50% Ca(OH)$_2$ | 530 |

II. LIME KILN DUSTS
A. Dolomitic Lime Kiln Dusts
1. Unconditioned Dusts
a. Martin-Marietta (Woodville, Ohio) Table 9

The average cylinder strengths of this mixture without additives ranged from 975 to 1035 psi, whereas the average strengths for the addition of CaO ranged from 875 to 1690 psi. The cylinder strengths with the addition of Ca(OH)$_2$ ranged from 645 to 885 psi. The range of values of the "synergistic effects" for the compressive (CS) and vacuum saturation (VS) strengths for each amount of additive follow:

| Amount and Type of Additive | Range of Values of "Synergistic Effect" (psi) | |
|---|---|---|
| | (CS) | (VS) |
| 0.75% CaO | −415 | 395 |
| 1.14% CaO | −260 | −85 |
| 1.50% CaO | −670 | −830 |
| 0.75% Ca(OH)$_2$ | −560 | −470 |
| 1.50% Ca(OH)$_2$ | −550 | −490 |
| 3.0% Ca(OH)$_2$ | −845 | −665 | b. Marblehead Lime (Chicago, Ill.) (Dolomitic dust) Table 10

The average cylinder strengths for this batch without additives ranged from 1085 to 1315 psi, whereas strengths with the addition of CaO ranged from 675 to 1080 psi. Cylinder strengths with the addition of Ca(OH)$_2$ ranged from 960 to 1880 psi. The range of values of the "synergistic effects" for the compressive (CS) and vacuum saturation (VS) strengths for each amount of additive follow:

| Amount and Type of Additive | Range of Values of "Synergistic Effect" (psi) | |
|---|---|---|
| | (CS) | (VS) |
| 0.75% CaO | −620 | −355 |
| 1.00% CaO | −1195 | −790 |
| 1.50% CaO | −1305 | −735 |
| 0.75% Ca(OH)$_2$ | 95 | −255 |
| 1.50% Ca(OH)$_2$ | −5 | −525 |
| 3.0% Ca(OH)$_2$ | −30 | −20 |

2. Dust Conditioned in the Laboratory with 12% Added Water.
Cylinders made from this dust were tested only for compressive strength without additives and with the addition of 0.75% CaO a. Martin-Marietta (Woodville, Ohio)
This dust was conditioned in the laboratory for 14.1 weeks. The compressive strength of the mixture made with the lab conditioned dolomitic lime kiln dust without additive is 395 psi, whereas the compressive strength of the mixture made with unconditioned dust without additive is 1035 psi. Addition of 0.75% CaO increases the strength to 1240 psi, resulting in a "synergistic effect" for this lab conditioned dust of 500 psi.

B. High Calcium Lime Kiln Dusts
1. Unconditioned Dusts
a. Marblehead Lime (Chicago, Ill.) High Calcium flue dust. Table 11

Strengths of the cylinders made with this dust without additives ranged from 2500 to 3330 psi, whereas strengths of cylinders made with the addition of CaO ranged from 1460 to 2680 psi. Cylinder strengths made with the addition of Ca(OH)$_2$ ranged from 1350 to 2185 psi. The range of values of the "synergistic effects" for the compressive (CS) and vacuum saturation (VS) strengths for each amount of additive follow:

| Amount and Type of Additive | Range of Values of "Synergistic Effects" (psi) | |
|---|---|---|
| | (CS) | (VS) |
| 0.75% CaO | −1055 | −1795 |
| 1.14% CaO | −1705 | −1545 |
| 1.50% CaO | −1315 | −1380 |
| 0.75% Ca(OH)$_2$ | −485 | −1715 |
| 1.50% Ca(OH)$_2$ | −865 | −1970 |
| 3.0% Ca(OH)$_2$ | −1700 | −2395 | b. Dravo Lime Co. (Maysville, Ky.) (Coarse Lime Kiln Dust) Table 12

Cylinders made with this dust without additives exhibited strengths which ranged from 595 to 1405 psi, whereas strengths of cylinders made with the addition of CaO ranged from 1255 to 1810 psi. Strength of cylinders made with the addition of Ca(OH)$_2$ ranged from 995 to 1585 psi. The range of "synergistic effects" for the compressive (CS) and vacuum saturation (VS) strengths for each amount of additive follow:

| Amount and Type of Additive | Range of Values of "Synergistic Effect" (psi) | |
|---|---|---|
| | (CS) | (VS) |
| 0.75% CaO | 535 | 85 |
| 1.14% CaO | −5 | −265 |
| 1.50% CaO | 225 | −550 |
| 0.75% Ca(OH)$_2$ | 715 | −155 |
| 1.50% Ca(OH)$_2$ | 730 | −570 |
| 3.0% Ca(OH)$_2$ | −195 | −430 |

2. Dust Conditioned in the Laboratory with 12% Added Water.
Cylinders made with this dust were tested only for compressive strength without additives and with an addition of 0.75% CaO a. Dravo Lime Co. (Maysville, Ky.) (Coarse Lime Kiln Dust) Table 13

This dust was lab conditioned for 16 weeks. The compressive strengths of cylinders made with the lab conditioned, high calcium lime kiln dust without additive averaged 1145 psi, whereas the compressive strengths of cylinders made with unconditioned dust, but without an additive, average 595 psi. Addition of 0.75% CaO increased the cylinder strength to 1795 psi. This resulted in a "synergistic effect" for this lab conditioned dust of 305 psi.

III. Miscellaneous Dusts
A. Cement Kiln Dusts from General Portland (Chattanooga, Tenn.) Crushed pellets. Table 14

Cylinders made without additives did not develop strength. The cylinder strengths with the addition of CaO ranged from 455 to 610 psi, whereas cylinder strengths with the addition of Ca(OH)$_2$ ranged from 390 to 765 psi. The "synergistic effect" data for the compressive (CS) and vacuum saturation (VS) strengths for each amount of additive follow:

| Amount and Type of Additive | Range of Values of "Synergistic Effects" (psi) | |
|---|---|---|
| | (CS) | (VS) |
| 0.75% CaO | 110 | 255 |
| 3.0% CaO | ND* | |
| 0.75% Ca(OH)$_2$ | 220 | 305 |
| 1.50% Ca(OH)$_2$ | 505 | 270 |
| 3.0% Ca(OH)$_2$ | 80** | — |

*ND. Not determined - a mixture with 3.0% CaO added to CaCO$_3$ as substitute for kiln dust was not made.
**Only the compressive strength was measure for this addition.

B. Lone Star Industries (Bonner Springs, Kans.) Dry Dust. Table 15

Only the compressive strengths were determined for cylinders made with this dust. The cylinders made from this mix without additives exhibited an average strength of 840 psi, whereas the compressive strengths of cylinders made with the addition of CaO ranged in average strength from 1385 to 1420 psi. The "synergistic effect" data for the compressive strengths for each amount of additive follow:

| Amount and Type of Additive | Values of "Synergistic Effect" (psi) |
|---|---|
| 0.76% CaO | 200 |
| 1.14% CaO | −85 |

C. Cement kiln dust from SME Cement (Silica, Ohio) Baghouse Dust (Separated Dust) Table 16

Cylinders made from this admixture without an additive developed an average compressive strength of 1510 psi. No vacuum saturation tests were performed on this barren admixture. The compressive and vacuum saturation strength tests, however, were made on batches to which CaO was added. The results of these tests ranged from 1745–2285 psi. The "synergistic effects" data from the compressive (CS) and vacuum saturation (VS) strengths for each amount of additive follow:

| Amount and Types of Additive | Range of Values of "Synergistic Effect" (psi) | |
|---|---|---|
| | (CS) | (VS)* |
| 0.25% CaO | 30 | 175 |
| 0.50% CaO | 200 | 210 |

*Initially only the compressive strengths of cylinders made from this mixture without additives were measured; therefore, the vacuum saturation strengths were compared to this to obtain the "synergistic effect".

IV. Miscellaneous Dusts Used With Fly Ashes Different From Trenton Channel Fly Ash A. Mixtures of Cement Kiln Dust from California Portland (Colton, Calif.), Fly Ash from Western Ash Co. (Color 2, Class "F") and Aggregate from France Stone Co. Table 18

Only the compressive strengths of cylinders were measured for these mixtures. The average strength of cylinders of this mixture without additives was 960 psi, whereas the average cylinder strength with a mix with 0.75% CaO was 1385 psi. The "synergistic effect" for the compressive strength for an addition of 0.75% CaO is 80* psi.

B. Mixtures of Cement Kiln Dust from SME Cement (Middlebranch, Ohio), Toledo Edison Bay Shore Fly Ash and Aggregate from France Stone Co. Table 18

Only the compressive strength was measured for these mixtures. The CaO slurry was added by two methods. In the first method, the slurry was allowed to cool for 20 minutes before it was added to the mix. In the second method, the CaO was mixed with water for one minute before it was added to the mix. The cylinder strengths of the mixture without additives averaged 650 psi. The cylinder strengths of the mixture with 0.75% CaO averaged 1815 psi for the 20 minute cooling time, and 1580 psi for the one minute cooling time. The "synergistic effect" for the compressive strength of cylinders with the addition of 0.75% CaO was 820* psi (20 minutes) and 585* psi (one minute).

*The mix with CaCO$_3$ as a substitute for kiln dust used Trenton Channel fly ash instead of Toledo Edison Bay Shore fly ash.

V. Cement Kiln Dusts Used with Fly Ash Other Than Trenton Channel Fly Ash in Mixtures by Weight of 6% Cement Kiln Dust, 8% Fly Ash, and 86% France Stone Co. Aggregate Table 19

A. Mixtures Using Cement Kiln Dust from SME Cement (Silica, Ohio) and Toledo Edison Bay Shore Fly Ash Only the compressive strengths of cylinders of this admixture were measured. The cylinders of this 8-8-84 mix without additive exhibited a compressive strength of 1380 psi, whereas the strength of cylinders of the 6-8-86 mixture with 0.75% CaO exhibited 2050 psi. The "synergistic effect" of the compressive strength for an addition of 0.75% CaO was 325* psi.

B. Mixtures Using Cement Kiln Dust from Columbia Cement (Zanesville, Ohio) Precipitator Dust Only the compressive strength of cylinders was measured for this admixture. The strength showed by cylinders made from an 8-8-84 mixture was 915 psi, whereas the strength of cylinders made from a 6-8-86 mixture with 0.75% CaO added was 1410 psi. The "synergistic effect" of the compressive strength for an addition of 0.75% CaO was 150* psi.

*The control mixture (CaCO$_3$ instead of kiln dust) plus 0.75% CaO used Trenton Channel fly ash instead of Toledo Edison Bay Shore fly ash. Therefore the values of the "synergistic effect" in this Section V should be interpreted with caution because both the mixes and the fly ash are not the same.

VI. Sodium Hydroxide Additions to 8-8-84 Mixtures of Cement Kiln Dust, Trenton Channel Fly Ash, and France Stone Co. Aggregate. Table 17

A. 1.0% NaOH Addition to Cement Kiln Dust from Lone Star Industries (Dixon, Ill.)

Only the compressive strength was measured for cylinders made from these mixtures. The cylinders made from the mixture without additive did not develop strength, whereas with an addition of 1.0% NaOH yielded an 830 psi average strength. The "synergistic effect" of the addition of 1.0% was 375 psi.

B. 1.0% NaOH Addition to Cement Kiln Dust from River Cement (Festus, Mo.)

Again, only the compressive strengths were measured for these mixtures. The cylinders made from the mixture without additive developed a strength of 675 psi, whereas the cylinders made from the mixture with an addition of 1.0% NaOH reached a strength of 1360 psi. The resultant "synergistic effect" was 230 psi.

C. 0.50% NaOH Addition to Cement Kiln Dust from Lone Star Industries (Bonner Springs, Kans.) Crushed Conditioned Pellets Cylinders of an 8-8-84 admixture of these components developed a strength of 210 psi. However, no strength developed for the mixture without additive. A control mixture (CaCO$_3$ as a substitute for kiln dust) with a 0.50% NaOH addition was not made, therefore no "synergistic effect" can be calculated.

Test Procedure

Twelve kiln dusts whch were selected to represent the spectra of dust available in the marketplace. These 12 dusts were tested in triplicate using no additive and three additions each of CaO (0.75%, 1.14%, 1.50%) and Ca(OH)$_2$ (0.75%, 1.50%, 3.0%).

In addition, compressive strengths and vacuum saturation strengths for each set of cylinders were measured. Two hundred tests were run which included 606 cylinders. Eighteen sets or 54 cylinders exhibited no strength development and are omitted from this summary. These sets include mixtures with additions of 0.75% potassium hydroxide (4 sets); 0.75% soda ash (4 sets); 0.75% and 1.50% hydrated dolomitic lime (7 sets); 0.75% potassium carbonate (2 sets) and 0.75% sodium metasilicate (1 set).

Study of the following summary and Tables 1-19 exhibit that, except for occasional anomalous values, there is a marked and compelling synergistic effect if CaO or Ca(OH)$_2$ is added to cement kiln dust, fly ash, and aggregate admixtures. The maximum synergistic effect for compressive and vacuum saturation strengths of each of the four types of cement kiln dusts previously classified are shown below. In addition, the maximum synergistic effect is listed for additions of CaO and Ca(OH)$_2$ at a given amount of additive.

lab-conditioned lime kiln dusts—one high calcium and one dolomitic—a positive synergistic effect resulted. This effect occurred only in the lab-conditioned dusts examined.

3. Study of Tables 1-19 shows that the vacuum saturation strengths data exhibit more variations than the compressive strengths data. The significance of these variations are difficult to ascertain.

4. It is interesting to note that the data in the leaderwork (un-numbered table) previously mentioned indicate that sometimes 1.14% CaO worked somewhat better than 0.75% CaO. This is believed to be related to the amount of free CaO inherent in the dust. For example, a dust which has a free CaO content somewhat lower than average would need more CaO added to obtain the maximum desired strength.

5. After detailed study of the data herewith presented, it is believed additions of fine-grained Ca(OH)$_2$ will work nearly as well or as well as additions of CaO of cement kiln dust, fly ash, and aggregate.

6. It should be kept in mind that the synergistic effect does not indicate absolute strength; however, it is the positive or negative difference in strength between the mix with the additive and the sum of the mix (without the additive) and the blank or control material (CaCO$_3$) used to replace the kiln dusts with the additive.

7. A possible explanation for variation in expected

SUMMARY OF TESTS

| TYPE OF CEMENT KILN DUST | SOURCE OF DUST | CYLINDER STRENGTH WITHOUT ADDITIVE | MAXIMUM SYNERGISTIC EFFECT USING CaO (psi) AT A GIVEN AMOUNT OF ADDITION | MAXIMUM SYNERGISTIC EFFECT USING Ca(OH)$_2$ (psi) AT A GIVEN AMOUNT OF ADDITION |
|---|---|---|---|---|
| Marginal Dusts | General Portland (Chattanooga) | 580 (CS) <br> 635 (VS) | 550 (CS)(0.75%) <br> 495 (VS)(0.75%) | 500 (CS)(0.75%) <br> 240 (VS)(0.75%) |
| | River Cement (Festus, MO) | 675 (CS) <br> 725 (VS) | 95 (CS)(1.14%) <br> 645 (VS)(1.14%) | 1110 (CS)(1.50%) <br> 575 (VS)(1.50%) |
| | Lone Star (Dixon, IL) | 0 (VS) | 555 (CS)(0.75%) | 265 (CS)(0.75%) |
| Separated Dusts | Columbia Cement (Zanesville) | 1130 (CS) <br> 1065 (VS) | 310 (CS)(0.25%) <br> 330 (VS)(0.25%) | 65 (CS)(1.50%) <br> −80 (VS)(1.50%) |
| | SME Cement (Silica, Ohio) | 1510 (CS) <br> 1510 (VS) | 200 (CS)(0.50%)** <br> 210 (VS)(0.50%)** | ND <br> ND |
| Conditioned Dusts (Conditioned at Plant) | Lone Star (Bonner Springs) Crushed Conditioned Pellets | 0 (CS) <br> 0 (VS) | 685 (CS)(0.75%) <br> 830 (CS)(1.50%) | 415 (CS)(0.75%) <br> 950 (VS)(3.0%) |
| | Martin-Marietta (Tulsa, OK) Conditioned Dust | 490 (CS) <br> 355 (VS) | 395 (CS)(0.75%) <br> 745 (VS)(0.75%) | 445 (CS)(0.75%) <br> 755 (VS)(3.0%) |
| (Conditioned in Laboratory) | River Cement (Festus, MO) (Marginal Dust) | 270 (CS) | 755 (CS)* | ND |
| | Columbia Cement (Zanesville) (Separated Dust) | 515 (CS) | 360 (CS)* | ND |
| Separated and Conditioned Dust | General Portland (Tampa, FL) Crushed Conditioned Pellets | 0 (CS) <br> 0 (VS) | 595 (CS)(1.50%) <br> 600 (VS)(0.75%) | 960 (CS)(1.50%) <br> 800 (VS)(3.0%) |
| | Dundee Cement (Clarksville, MO) | 145 (CS) | 805 (CS)(1.14%) | 745 (CS)(0.75%) |

*Result of 0.75% CaO addition. ND - Test on this additive not run.
**Only additions of 0.25% and 0.50% studied.

1. A study of these data presented shows that in most cases the amount of CaO at which the greatest synergistic effect occurred, was 0.75% or 1.14%. When Ca(OH)$_2$ was added to the mix, the greatest synergistic effect resulted from the additions of 0.75% or 1.50 % with only several exceptions.

2. Adding CaO or Ca(OH)$_2$ to unconditioned high calcium or dolomitic lime kiln dusts usually resulted in a negative synergistic effect. However, in the case of strength values may be related to the moisture contents of the various batches. The moisture content affects the degree of compaction and the calculated dry unit weight (density) of the compacted mixture. Furthermore, the moisture content also affects the water-cement ratio which in turn affects the degree of cementitious reactions in the mix.

8. Possible sources of variation in the data.

a. Weighing errors batching.
b. Variations in mixing such as mixing time and changes in shape of bread hook of the mixer through use.
c. Variation in laboratory temperature and humidity.
d. Variation in curing temperature.
e. Moisture content.
  1. It is difficult to economically determine the "optimum moisture" for every batch.

Additional tests were run for compressive strength of cylinders made from mixtures of cement kiln dust, fly ash, sulfurization scrubber sludge, and CaO as water slurry.

ASTM C593 was used as a guide in carrying out the compressive strength tests reported herein. However, making and handling cylinders made from mixtures containing more than 40% water required changes from the procedures described in ASTM C593 regarding compaction, demolding, and curing.

Two mixtures were made containing cement kiln dust from Columbia Cement (Zanesville, Ohio) (dry precipitator dust), Toledo Edison Bay Shore fly ash, and desulfurization scrubber sludge filter cake from CSI Conversion Systems (Horsham, Pa.). Two additional mixtures were made from the same ingredients with 0.75% or 1.0 CaO added as a water slurry.

The sludge was weighed into the mixing bowl and was homogenized using a paddle attached to a planetary drive. The kiln dust and fly ash were added and thoroughly mixed before adding the CaO slurry. The mixture was mixed for an additional three minutes after the addition of the slurry.

Because the consistency of the mixture is similar to that of soft ice cream, the cylinders were filled by pouring the mixture into the mold, and shaking the mold and moving a knife through the mixture to eliminate voids. The mixture was cured inside the mold at room temperature. To minimize moisture loss, a plastic bag was fitted around the open end of the mold and was held in place by rubber bands. The cylinders were removed from the molds after curing for seven days, and were placed inside two self-sealing plastic bags for the remainder of the cure. At the end of the cure the firm cylinders (those hard enough so that they could not be idented by finger pressure) were capped with molten sulfur capping compound. All cylinders were then tested for compressive strength.

Ten pound batches of each mixture were made. This amount was sufficient for two cylinders and two moisture samples. One cylinder was measured for compressive strength; the second cylinder will be tested for water permeability.

The average moisture content of the desulfurization sludge was determined to be 64.8% on a wet basis. The moisture contents of the cylinders are also reported on a wet basis, whereas the moisture contents of the other cylinders in the previously described tests are reported on a dry basis.

The following table lists the compressive strength for each cylinder. It also lists the machine load for each cylinder; the cross-sectional area; the wet unit weight (density); and the moisture content (wet basis). The dry unit weight was not calculated because the objective was to bind chemically some of the water.

TABLE 20

| Weight Percentages of Cement Kiln Dust - Fly Ash - Desulfurization Scrubber Sludge and Additive | Cylinder No. | Machine Load (lb) | Cross-Sectional Area of Cylinder (in$^2$) | Compressive Strength (psi) (73° F. - 76 days) | Wet Unit Weight (lb/ft$^3$) | Moisture Content (%) (Wet Basis) |
|---|---|---|---|---|---|---|
| 8-16-76, No Additive | #1 | 220 | 12.55 | 18 | 88.5 | 49.8 |
| 7-16-76.25 + 0.75% CaO | #1 | 520 | 12.55 | 41 | 88.8 | 50.9 |
| 13-15-72, No Additive | #1 | 660 | 12.59 | 52 | 88.5 | 45.8 |
| 12-15-72 + 1% CaO | #2 | 2470 | 12.55 | 197 | 90.0 | 47.4 |

Permeability tests were run on the samples incorporating desulfurization scrubber sludge. The samples were enclosed in rubber membranes and placed in conventional triaxial chambers with chamber pressure applied. Back pressure, slightly less than chamber pressure, was applied at one end of the specimen, while the other end was open to the atmosphere. Water was flushed through the specimens from the high pressure end to the low pressure (atmosphere) end until a stabilized flow was achieved. Test results for each sample are as follows:

|  | Sample 1 | Sample 2 | Sample 3 |
|---|---|---|---|
| Moisture Content, % | | | |
| Initial | 89.8 | 87.0 | 73.5 |
| Final | 93.2 | 85.5 | 77.7 |
| Wet Unit Weight, pcf | | | |
| Initial | 94.4 | 97.0 | 96.0 |
| Final | 96.1 | 96.2 | 98.3 |
| Dry Unit Weight, pcf | | | |
| Initial | 49.7 | 51.9 | 55.3 |
| Back Pressure Saturation, psi | | | |
| Pressures | 10.0 | 10.0 | 10.0 |
| Permeability, cm/sec | | | |
| k | $5.6 \times 10^{-8}$ | $4.1 \times 10^{-6}$ | $4.7 \times 10^{-7}$ |

These results show the positive effect of beneficiation test on permeability of the stabilized sludge materials.

Tests were also conducted on samples utilizing fresh as well as stored cement kiln dust and are summarized in the following table 21.

TABLE 21

| Description of Lone Star (Bonner Springs, Kans.) Cement Kiln Dust | Source of Fly Ash | Weight Percentages of CKD - FA - Aggregate + Additive | Cylinder No. | Machine Load (lb) | Sectional Area of Cylinder (in²) | Compressive Strength (psi) (100° - 7 days) | | Wet Unit Weight (lb/ft³) | Moisture Content (%) | Dry Unit Weight (lb/ft³) | Percentage of Maximum Dry Unit Weight (129.6 = 100%) |
|---|---|---|---|---|---|---|---|---|---|---|---|
| Fresh Dust | Toledo Edison Bay Shore | 8-8-84, No additive | #1 #2 #3 | 14,900 10,400 13,300 | 12.91 12.83 12.95 | 1155 810 1025 | | 137.7 136.8 139.2 | 8.9 8.8 8.8 | 126.4 125.7 127.9 | 97.5 97.0 98.7 |
| | | | | | | | Average = 995 | | | | |
| Fresh Dust | Toledo Edison Bay Shore | 8-8-83.25 + 0.75% CaO | #1 #2 #3 | 24,100 24,300 23,600 | 12.91 12.87 12.95 | 1865 1890 1820 | | 137.9 142.8 142.2 142.5 | 8.8 10.2 10.1 10.3 | 126.7 129.6 129.2 129.2 | 97.8 100.0 99.7 99.7 |
| | | | | | | | Average = 1860 | | | | |
| Fresh Dust | Class "F" Supplied by Superior Asphalt | 7-8-84.25 + 0.75% CaO | #1 #2 #3 | 19,300 21,300 21,500 | 12.91 12.87 12.87 | 1495 1655 1670 | | 142.5 137.1 136.8 138.0 | 10.2 9.1 9.1 9.3 | 129.3 125.7 125.4 126.3 | 99.8 97.0 96.8 97.5 |
| | | | | | | | Average = 1605 | | | | |
| Fresh Pellets (Crushed) | Toledo Edison Bay Shore | 8-8-84 No additive | #1 #2 #3 | FS FS FS | 12.63 12.67 12.63 | — (FS) — (FS) — (FS) | | 137.3 139.5 138.9 138.3 | 9.2 9.6 9.1 9.4 | 125.8 127.3 127.3 126.4 | 97.1 98.2 98.2 97.5 |
| | | | | | | | Average | | | | |
| Fresh Pellets (Crushed) | Toledo Edison Bay Shore | 8-8-83.25 + 0.75% CaO | #1 #2 #3 | 14,900 14,900 10,900 | 12.67 12.63 12.67 | 1175 1180 860 | | 138.9 136.2 137.1 135.9 | 9.4 9.2 9.3 9.0 | 127.0 124.7 125.4 124.7 | 98.0 96.2 96.8 96.2 |
| | | | | | | | Average = 1070 | | | | |
| Fresh Pellets (Crushed) | Class "F" Supplied by Superior Asphalt | 7-8-84.25 + 0.75% CaO | #1 #2 #3 | 14,600 14,800 15,000 | 12.95 12.83 12.79 | 1125 1155 1175 | | 136.4 139.2 140.1 140.1 | 9.2 9.9 10.4 10.0 | 124.9 126.7 126.9 127.4 | 96.4 97.8 97.9 98.3 |
| | | | | | | | Average = 1150 | | | | |
| 30 Day Old Pellets (Crushed) | Toledo Edison Bay Shore | 8-8-84 No additive | #1 #2 #3 | BC BC BC | ND ND ND | — (BC) — (BC) — (BC) | | 139.8 139.8 139.8 | 10.1 10.2 10.2 10.4 | 127.0 126.9 126.9 126.6 | 98.0 97.9 97.9 97.7 |
| | | | | | | | Average = | | | | |
| 30 Day Old Pellets (Crushed) | Toledo Edison Bay Shore | 8-8-83.25 + 0.75% CaO | #1 #2 #3 | 10,800 10,400 11,100 | 12.87 12.83 12.91 | 840 810 860 | | 139.8 141.6 141.0 141.0 | 10.3 11.3 11.3 11.3 | 126.8 127.2 126.7 126.7 | 97.8 98.1 97.8 97.8 |
| | | | | | | | Average = 835 | | | | |
| 30 Day Old Pellets (Crushed) | Class "F" Supplied by Superior Asphalt | 7-8-84.25 + 0.75% CaO | #1 #2 #3 | 14,400 14,100 14,300 | 12.91 12.95 12.91 | 1115 1090 1110 | | 141.2 141.6 142.2 142.2 | 11.3 10.5 10.7 10.1 | 126.9 128.1 128.5 129.2 | 97.9 98.8 99.2 99.7 |
| | | | | | | | Average = 1105 | | | | |
| Two Year Old Pellets (Crushed) | Toledo Edison Bay Shore | 8-8-84 No additive | #1 #2 #3 | FS FS FS | 12.83 12.91 12.99 | — (FS) — (FS) — (FS) | | 142.0 141.9 134.7 139.5 | 10.4 9.6 9.8 10.4 | 128.6 129.5 122.7 10.4 | 99.2 99.9 94.7 97.5 |
| | | | | | | | Average = | | | | |
| Two Year Old Pellets (Crushed) | Toledo Edison Bay Shore | 8-8-83.25 + 0.75% CaO | #1 #2 #3 | 13,700 13,500 13,600 | 12.91 12.95 12.91 | 1060 1040 1055 | | 138.7 141.3 141.0 141.3 | 9.9 9.4 9.2 9.5 | 126.2 129.2 129.1 129.0 | 97.4 99.7 99.6 99.5 |
| | | | | | | | Average = 1050 | | | | |
| Two Year Old Pellets (Crushed) | Class "F" Supplied | 7-8-84.25 + 0.75% CaO | #1 #2 | 12,100 13,100 | 12.8* 12.8* | 940 1015 | | 141.2 142.5 142.8 | 9.4 10.5 10.6 | 129.1 129.0 129.1 | 99.6 99.5 99.6 |

TABLE 21-continued

| Description of Lone Star (Bonner Springs, Kans.) Cement Kiln Dust | Source of Fly Ash | Weight Percentages of CKD - FA - Aggregate + Additive | Cylinder No. | Machine Load (lb) | Sectional Area of Cylinder (in²) | Compressive Strength (psi) (100° - 7 days) | Wet Unit Weight (lb/ft³) | Moisture Content (%) | Dry Unit Weight (lb/ft³) | Percentage of Maximum Dry Unit Weight (129.6 = 100%) |
|---|---|---|---|---|---|---|---|---|---|---|
| | by Superior Asphalt | | #3 | 7,900** | 12.8* | 610** | 140.4 | 10.6 | 126.9 | 97.9 |
| | | | | | | Average = 855 | 141.9 | 10.6 | 128.3 | 99.0 |

BC—Cylinder broke while removing from capper.
ND—Not determined.
FS—Cylinder fell apart in four hour water soak.
*The circumference of the cylinder was not measured. The compressive strength was calculated from a cross-sectional area of 12.8 in.²
**The low strength of this cylinder could have been caused by a horizontal crack.

We claim:

1. A mixture consisting essentially of pozzolan, kiln dust, a filler, and a small amount of material selected from the group comprising calcium oxide, calcium hydroxide, and sodium hydroxide, which through pozzolanic reactions produces a durable mass, the pozzolan comprising between about 6 and 24% by dry weight, the kiln dust comprising between 4 and 16% by dry weight, the filler comprising between about 60 to 90% by dry weight, the material selected from the group consisting of less than 1.5% by dry weight, of calcium oxide, of less than 2.0% by dry weight, of calcium oxide, of less than 2.0% by dry weight of calcium hydroxide, and less than 1% by weight of sodium hydroxide.

2. The mixture set forth in claim 1 wherein the material selected from the group consists of about 0.75% to 1.5% by dry weight, of calcium oxide, of about 0.75% to 2% calcium hydroxide, and less than 1% by weight of sodium hydroxize.

3. The mixture set forth in claim 1 or 2 wherein the pozzolan comprises fly ash.

4. The mixture set forth in claim 1 or 2 wherein the filler comprises aggregate.

5. The mixture set forth in claim 1 or 2 wherein the filler comprises sludge.

6. The mixture set forth in claim 1 or 2 wherein the pozzolan comprises fly ash and the filler comprises aggregate.

7. The mixture set forth in claim 1 or 2 wherein the pozzolan comprises fly ash and the filler comprises sludge.

8. The method of making a durable mass which comprises mixing kiln dust, pozzolan, a filler, and a material selected from the group consisting of calcium oxide, calcium hydroxide, and sodium hydroxide, and water, and permitting the mixture to react at ambient temperatures to produce a durable mass the pozzolan comprising between about 6 and 24% by dry weight, the kiln dust comprising between 4 and 16% by dry weight, the filler comprising between about 60 and 90% by dry weight, the material selected from the group consisting of less than 1.5% by dry weight, of calcium oxide, of less than 2.0% by dry weight of calcium hydroxide, and less than 1% by weight of sodium hydroxide.

9. The method set forth in claim 8 wherein the material selected from the group consists of about 0.75–1.5% by dry weight, of calcium oxide, of about 0.75–2% by dry weight of calcium hydroxide, and of less than 1% by weight of sodium hydroxide.

10. The method set forth in claim 8 or 9 wherein the pozzolan comprises fly ash.

11. The method set forth in claim 8 or 9 wherein the filler comprises aggregate.

12. The method set forth in claim 8 or 9 wherein the filler comprises sludge.

13. The method set forth in claim 8 or 9 wherein the pozzolan comprises fly ash and the filler comprises aggregate.

14. The method set forth in claim 8 or 9 wherein the pozzolan comprises fly ash and the filler comprises sludge.

15. The method of making a durable mass which comprises
conditioning kiln dust by adding water,
storing the kiln dust,
and thereafter mixing the kiln dust, pozzolan, a filler, and a material selected from the group consisting of calcium oxide, calcium hydroxide and sodium hydroxide, and water, and permitting the mixture to react to ambient temperatures to produce a hard, strong, durable mass, the pozzolan comprising between about 6 and 2.4% by dry weight, the kiln dust comprising between 4 and 16% by dry weight, the filer comprising between about 60 to 90% by dry weight, the material selected from the group consisting of less than 1.5% by dry weight, of calcium oxide, of less than 2.0% by dry weight of calcium hydroxide, and less than 1% by weight of sodium hydroxide.

16. The method set forth in claim 15 wherein the material selected from the group consists of about 0.75–1.5% by dry weight, of calcium oxide, of about 0.75–2% by dry weight of calcium hydroxide calcium hydroxide, and of less than 1% by weight of sodium hydroxide.

17. The method set forth in claim 15 or 16 wherein the pozzolan comprises fly ash.

18. The method set forth in claim 15 or 16 wherein the filler comprises aggregate.

19. The method set forth in claims 15 or 16 wherein the filler comprises sludge.

20. The method set forth in claim 15 or 16 wherein the pozzolan comprises fly ahs and the filler comprises aggregate.

21. The method set forth in claim 15 or 16 wherein the pozzolan comprises fly ash and the filler comprises sludge.

* * * * *